United States Patent [19]

Karabatsos

[11] Patent Number: 4,764,893
[45] Date of Patent: Aug. 16, 1988

[54] NOISE-IMMUNE INTERRUPT LEVEL SHARING

[75] Inventor: Chris Karabatsos, Kingston, N.Y.

[73] Assignee: International Business Machines Corporation, Armonk, N.Y.

[21] Appl. No.: 727,653

[22] Filed: Apr. 26, 1985

[51] Int. Cl.[4] .......................... G06F 9/46; G06F 11/30
[52] U.S. Cl. ..................................... 364/900; 371/64; 340/825.5
[58] Field of Search ................... 364/200, 900, 431.11, 364/431.06; 340/825.5, 825.51; 371/64, 67, 71

[56] References Cited

U.S. PATENT DOCUMENTS

| | | | |
|---|---|---|---|
| 4,282,573 | 8/1981 | Imai et al. | 364/431.11 |
| 4,410,938 | 10/1983 | Higashiyama | 364/200 |
| 4,599,695 | 7/1986 | Deutsch | 364/431.11 |
| 4,630,041 | 12/1986 | Casmatta et al. | 364/200 |
| 4,631,670 | 12/1986 | Bradley et al. | 364/200 |

FOREIGN PATENT DOCUMENTS 0167827 6/1985 European Pat. Off. .

OTHER PUBLICATIONS

Patent Abstracts of Japan, vol. 7, No. 278 (p. 242) [1423], 10th Dec., 1983; & JP-A-58 155 447 (Tokyo Shibaura Denki K.K.) 16-09-1983.
IBM Technical Disclosure Bulletin, vol. 18, No. 3, Aug. 1975, pp. 767, 768, P. Favre: "Device for Fast I/O Selection".
Patent Abstracts of Japan, vol. 8, No. 169 (p. 292) [1606], 4th Aug. 1984 & JP-A-59 65 333 (Fujitsu K.K.) 13-04-1984.

Primary Examiner—Gareth D. Shaw
Assistant Examiner—Kevin A. Kriess
Attorney, Agent, or Firm—Frederick D. Poag; Robert L. Troike

[57] ABSTRACT

An interrupt interface circuit for connection to a shared interrupt request line. An internally generated interrupt impresses an interrupt request line and also locks out any further interrupt requests until the interrupt request is analyzed to be of a minimum duration, in which case the lock out is latched. An interrupt request on the shared interrupt request line is also analyzed for minimum duration before it causes a lock out to be latched. A latched lock out is removed by a signal generated by the interrupt handler.

11 Claims, 4 Drawing Sheets

NOISE-IMMUNE INTERRUPT LEVEL SHARING

BACKGROUND OF THE INVENTION

The invention relates generally to computer systems. In particular, the invention relates to the sharing of an interrupt level by multiple interrupt sources.

Many computer systems rely upon the use of interrupts to allow, for instance, peripheral devices to request servicing by the central processor. The peripheral device issues an interrupt request to an interrupt handler associated with the processor. When the interrupt handler receives the interrupt request, the normal execution of the processor is interrupted and the processor goes into an interrupt handling procedure. A popular type of interrupt handler is the 8259, manufactured by the Intel Corporation. The 8259 provides for eight different levels of prioritized interrupts so that eight different interrupting peripheral devices can be supported. However, as computer systems have become more complex, more than eight peripheral devices need to be provided for. Bradley et al. in U.S. patent application No. 629,868, filed July 11, 1984, now U.S. Pat. No. 4,631,670, and incorporated herein by reference, describe a method of interrupt level sharing such that more than one peripheral device can use a single interrupt level. One simple embodiment of Bradley's invention is shown in FIG. 1 for an interrupt circuit 10. An interrupt request line 12 is connected in parallel to this and other interrupt circuits 10. The shared interrupt request line 12 is also connected to the 8259 interrupt handler. Assuming that there are no outstanding interrupt requests for the interrupt level associated with the interrupt request line 12, the peripheral device associated with the illustrated interrupt circuit 10 requests an interrupt service by issuing a continued high signal INTERRUPT. An AND gate 14 receives this signal INTERRUPT and, in the absence of other outstanding requests, passes the interrupt request to a one shot pulse generator 16. Again, the pulse generator 16 is enabled in the absence of an outstanding service request and for a pulse duration it enables an output amplifier 18. The output amplifier 18 has its input connected to ground and its output separated from a positive voltage by a resistor 20. Therefore, during the pulse width of the pulse generator 16, the interrupt request line 12 is brought to ground. Otherwise, the illustrated interrupt circuit 10 presents a high impedance to the interrupt request line 12. Because of this high impedance, other interrupt circuits attached to the same interrupt request line 12 can likewise produce a negative pulse on the interrupt request line 12.

The 8259 interrupt handler does not respond to the negative transition of the negative pulse but rather to the final positive transition of the negative pulse on the interrupt request line 12. This same upward transition clocks the flip-flop 22 to produce a low complemented output −Q3 that disables the pulse generator 16. As a result, the pulse generator 16 remains disabled until a software generated REENABLE signal clears the flip-flop 22. The preceding discussion of the disabling and reenabling applies whether the negative pulse on the interrupt request line 12 originated in the illustrated interrupt circuits or one of the other interrupt circuits. The effect of the interrupt circuit 10 is to lock out any further interrupt requests until the software generated REENABLE signal indicates that the interrupt service has been completed.

It should be noted that the interrupt handling routine that the processor performs upon receipt of an interrupt request usually polls all the peripheral devices attached to that interrupt request line 12 to determine which device is requesting the interrupt. This polling is done by separate signal lines, not shown. Once a peripheral device has been serviced for its interrupt request, it removes its internal interrupt request INTERRUPT. If the polling does not uncover all interrupt requests, such as when the processor polls only once and the peripheral device requests its interrupt just after being polled, the internal interrupt signal INTERRUPT remains high and the removal of the disabling causes another negative pulse to be impressed on the interrupt request line 12.

The inventor has discovered a problem with the interrupt circuit of Bradley et al. The 8259 requires that the negative pulse on the interrupt request line have a minimum duration of 125 nanoseconds. For any shorter pulse, the 8259 does not recognize the interrupt request and accordingly the interrupt handling procedures are not initiated. However, the inhibiting flip-flop 22 of Bradley et al. responds much more quickly so that a negative pulse of, for example, 5 nanoseconds, will cause the flip-flop 22 to lock out this interrupt circuit 10 and all similar interrupt circuits. Assuming that all the peripheral devices have similar interrupt circuits, any such accidental lock out means that there will be no more interrupt requests. Accordingly, the processor has no reason to enter its interrupt handling procedure and thus to eventually reenable the interrupt circuits. Bradley also discusses a clocked embodiment of an interrupt circuit. This embodiment is slightly more complex than the non-clocked embodiment of FIG. 1, but, nonetheless, it is simple enough that it also is inhibited by a negative pulse considerably less than 125 nanoseconds.

The inventor has further determined that the interrupt request line 12 is relatively noisy and contains frequent noise pulses having a duration of less than 20 nanoseconds. The interrupt request line 12 is often left in a high impedance state so that it is then acting as an antenna for spurious signals. It would be possible to reduce the noise on the interrupt request line 12 by the use of coaxial cable. However, the interrupt request line is very often wired between corresponding pins of several edge connectors. The use of coaxial cable for such a connection is considered to be unduly expensive.

Another possible solution would be to attach a low-pass filter to the interrupt request line 12 or possible to include this low-pass filter in the feedback to the flip-flop 22. However, such a filter would smooth the transitions of all signals on the interrupt request line 12, thus slowing the response and running counter to the standard practice of maintaining the transitions as sharp as possible.

SUMMARY OF THE INVENTION

Accordingly, an object of this invention is to provide noise immunity to an interrupt level sharing circuit.

A further object of this invention is to provide such noise immunity without degrading the time response of the interrupt circuit.

The invention can be summarized as an interrupt circuit for interrupt level sharing in which an internal interrupt request immediately locks out further internal requests. The interrupt request signal is analyzed to see that it persists for at least a minimum time, in which case, the interrupt circuit is locked out from sending further interrupt requests until a separate reset signal is received. If, however, the interrupt signal is less than the minimum time, then a lock out naturally terminates. Interrupt requests received on the shared interrupt request line are subjected to the same time determination before they are allowed to initiate the continuing lock out.

DETAILED DESCRIPTION OF THE PREFERRED EMBODIMENT

Figure 1:
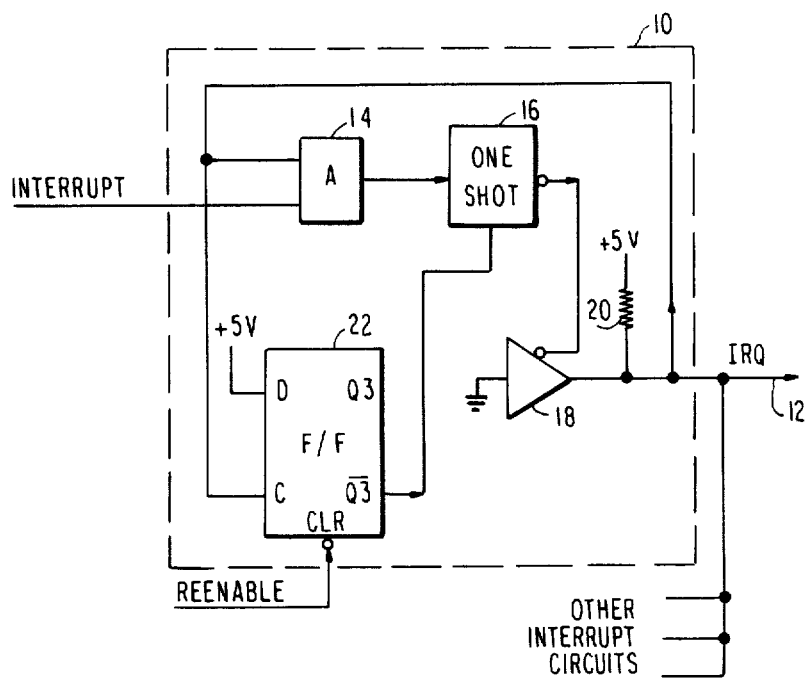
FIG. 1 is a schematic illustration of a shared interrupt circuit of the prior art.
Figure 2:
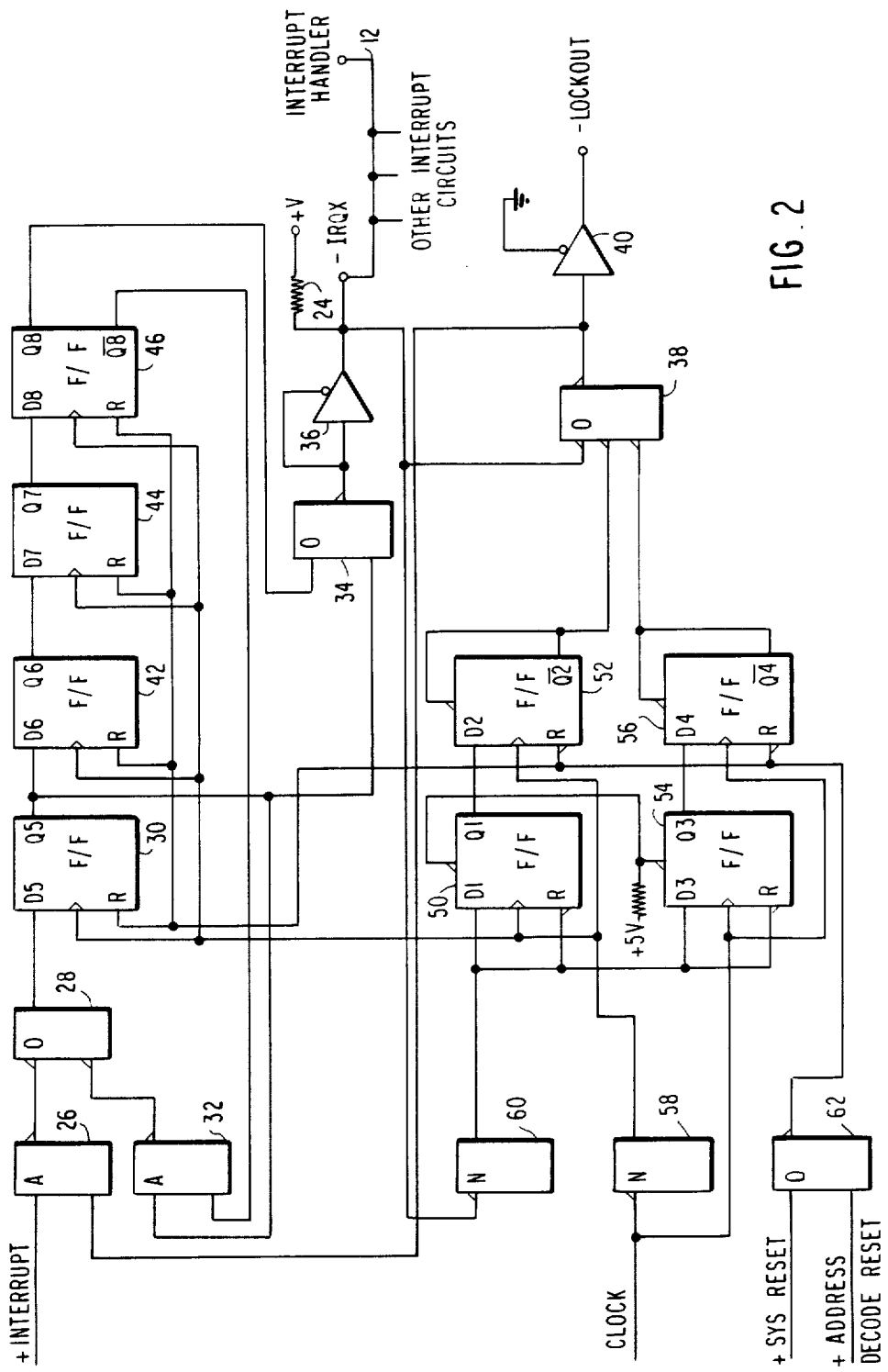
FIG. 2 is a schematic illustration of a clocked embodiment of the shared interrupt circuit of the present invention.

A schematic for a preferred embodiment of the interrupt circuit of the present invention is shown in FIG. 2. This interrupt circuit would be duplicated at adaptors of each of the devices sharing the interrupt request line 12. The interrupt request line 12 is also connected to the 8259 interrupt handler. The signal on the shared interrupt request line 12 is a signal −IRQX that is active when low and is in a high impedance state otherwise. Although the invention of Bradley was centered upon the fact that the 8259 responds to an upward transition of the signal −IRQX, this invention can be equally applied to interrupt handlers having a different response. It is assumed, however, that the interrupt handler must sense a negative pulse having a duration of at least 125 nanoseconds before it can respond to an interrupt request.

In this initial discussion, let it be assumed that there are no other outstanding interrupt requests so that the signal −IRQX is in the high impedance state and, by virtue of a pull-up resistor between the shared interrupt request line 12 and a positive voltage +V, is at a high value. Also, it is assumed that a −LOCKOUT signal, to be described later, is high.

Figure 3:
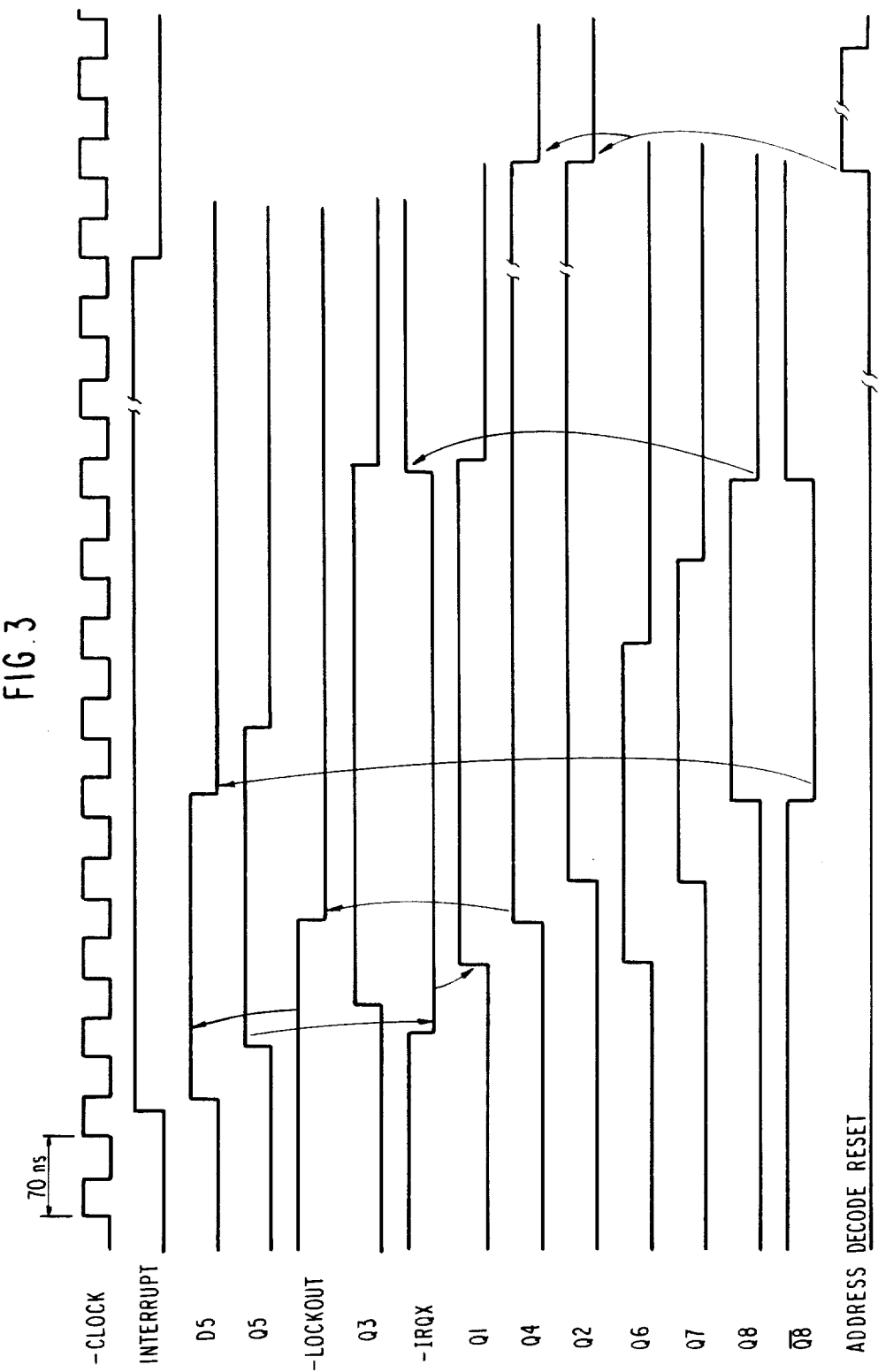
FIG. 3 is a timing diagram for the local generation of an interrupt request for the circuit of FIG. 2.

The circuit of FIG. 2 is a clocked circuit having a clock period of 70 ns. The clock providing a clock signal CLOCK does not need to be common between the various interrupt circuits connected to the shared interrupt request line 12. The adaptor requests an interrupt with a high INTERRUPT signal, as illustrated in FIG. 3. The INTERRUPT signal, in the absence of an outstanding interrupt request, passes through a first AND gate 26 and an OR gate 28 with inverting inputs to produce a signal at the data input D5 of a D-type flip-flop 30. In standard TTL terminology, the AND gate 26 may be a type 00; the OR gate may be a 00; and the flip-flop may be a 175.

The flip-flop 30 clocks data on the upward transition of a complemented clock signal −CLOCK so that at the first upward −CLOCK transition following a high D5 signal, the flip-flop 30 produces a high Q5 signal on its output. The Q5 signal is fed to three places. It is an input to a second AND gate 32, also of the type 00, and the output of which is led through the OR gate 28 to the flip-flop 30. Until the second input to the second AND gate 32 goes low, there results a feedback circuit that keeps the Q5 output of the flip-flop 30 high regardless of whether the INTERRUPT signal goes low.

The signal Q5 on the output of the flip-flop 30 is also fed through another OR gate 34 with an inverting output and from there to both the input and an inverting enable of a buffer 36. The OR gate 34 may be a type 02 and the buffer 36 a type 125. The output of the buffer 36 is connected to the shared interrupt request line 12. The result of the dual connection to both the input and the inverting enable of the buffer 36 is a low voltage output in the presence of a low voltage input and is a high impedance output in the presence of a high voltage input. As a result, shortly after the Q5 signal goes positive, the −IRQX signal on the shared interrupt request line 12 goes negative. The −IRQX signal is fed through an OR gate 38 having inverting inputs and an inverting output. This OR gate 38 may be a type 11. The output of the OR gate 38 is the previously mentioned −LOCKOUT signal which is fed to the other input of the first AND gate 26. A buffer 40 provides a test point for the −LOCKOUT signal and is not necessary in normal operation. The −LOCKOUT signal locks out further INTERRUPT signals from entering the circuit. The timing diagram of FIG. 3 does not show the effect upon the −LOCKOUT signal of the original −IRQX signal since the D5 input to the flip-flop 30 is latched in this initial phase anyway.

The Q5 output of the flip-flop 30 is also fed to a chain of three delaying flip-flops 42, 44 and 46 of the same 175 type and having the same −CLOCK input as the flip-flop 30. Each of the delaying flip-flops 42–46 delays the Q5 signal by another full clock period. The inverting output −Q8 of the third delaying flip-flop 46 is connected to the second input of the second AND gate 32 such that, three clock periods after the positive Q5 transition, the feedback through the AND gate 32 is interrupted and at the fourth clock period the Q5 signal falls as a result. The positive output Q8 of the third delaying flip-flop 46 is connected to the OR gate 34 so that even when Q5 falls, Q8 keeps the −IRQX signal low for three more clock periods. The result, in normal circumstances, is a −IRQX negative pulse that is eight clock periods or 560 ns long.

The −IRQX signal from the output of the buffer 36 is also fed to a pulse width discriminating section consisting of a first pair of flip-flops 50 and 52 and a second pair 54 and 56. The first pair 50 and 52 are 180° out of phase with respect to the second pair 54 and 56 because the clock inputs of the first pair 50 and 52 are connected to the non-inverted CLOCK signal through a NOT gate 58 while the second pair 54 and 56 have their clock inputs directly connected to the non-inverted CLOCK signal. The −IRQX signal is connected to the data inputs and the reset inputs of the first flip-flops 50 and 54 of both pairs through another NOT gate 60. The flip-flops 50–56 may be of the type 74 and the NOT gates 58 and 60 may be of the type 04. The NOT gate 60 inverts the −IRQX pulse at the data input D1 of the flip-flop 50. On the next upward transition of the inverted clock signal −CLOCK, the flip-flop 50 latches the signal on its data input D1 to its output Q1. Presuming that the −IRQX signal remains low, on the next clock cycle, the second flip-flop 52 latches the Q1 output connected to its data input D2 and produces an inverted or low signal on its inverting output −Q2. The inverted output −Q2 of the flip-flop 52 is fed back to its preset input P. This preset input P is clock independent but is subservient to a reset input R. When the preset input is low, the flip-flop 52 continues or maintains the previous state. That is, the feedback from the −Q2 output to the preset input P latches the −Q2 output at a low value regardless of subsequent signals on the clock signal or the signal on the data input D2. The latch is removed only by resetting the reset input R of the flip-flop 52.

This immediately previous discussion assumed that the −IRQX signal remained low for the clock period between the upward transitions of the inverted clock signal −CLOCK that triggered the flip-flops 50 and 52 respectively. If, however, the −IRQX signal goes high during this intervening period, such as would be caused by a short noise pulse, the output of the NOT gate 60 goes low. This output is connected to the complement reset input R of the first flip-flop 50 and causes the flip-flop to immediately reset to a low value on its output Q1. Thus, in this situation, on the second clock transition, the second flip-flop 52 sees a low signal on its data input D2 and thus no feedback latch is established. Thus, the first pair of flip-flops 50 and 52 act as a pulse width discriminator that produces a latched low output on the −Q2 output of the flip-flp 52 only if the −IRQX signal is at least one clock period long, 70 ns in the example. However, because the first pair of flip-flops 50 and 52 are insensitive to the beginning edge of the −IRQX negative pulse, it is uncertain whether they latch the −Q2 output for a −IRQX pulse between 1 and 2 clock periods, 70–140 ns in the example.

In order to reduce this uncertainty, the second pair of flip-flops 54 and 56 are connected similarly to the first pair 50 and 52 except they are clocked by the non-inverted clock signal CLOCK, That is, the second pair 54 and 56 are 180° out of phase with the first pair 50 and 52. The −Q4 output of the flip-flop 56 is similarly latched with the same uncertainty associated with the latching of the −Q2 output. However, both the −Q2 and the −Q4 are connected to inputs of the OR gate 38. The uncertainty of the combined signal is reduced by one-half clock period. That is, there is no latching for a −IRQX pulse of less than one clock period; there is uncertain latching for a pulse of between one and one and one-half clock periods; and, there is certain latching above one and a half clock periods. In the described embodiment, all noise pulses below 70 ns are rejected while any negative pulse enduring for 115 ns produces a latched −Q2 or −Q4 output that causes the −LOCKOUT signal to be thereafter latched low.

The −LOCKOUT signal can be unlatched only by resetting the flip-flops 52 and 56. The complement reset inputs R of these two flip-flops 52 and 56 are connected to an inverting output of an OR gate 62 of the type 02. Two inputs to this OR gate 62 are the +ADDRESS DECODE RESET and +SYS RESET. The ADDRESS DECODE RESET can be controlled by the software of the interrupt handling procedure. The software resets the interrupt circuit, that is, removes the −LOCKOUT signal, when it has completed servicing of all the interrupts. It should be noted that if the polling of the interrupt servicing has failed to uncover a recently generated INTERRUPT request, the removal of the lockout allows this high level INTERRUPT signal to pass the first AND gate 26 and thus to initiate the previously described procedure. The SYS RESET input to the OR gate 62 can be used on system start-up to provide reliable initial values to the interrupt circuit.

Figure 4:
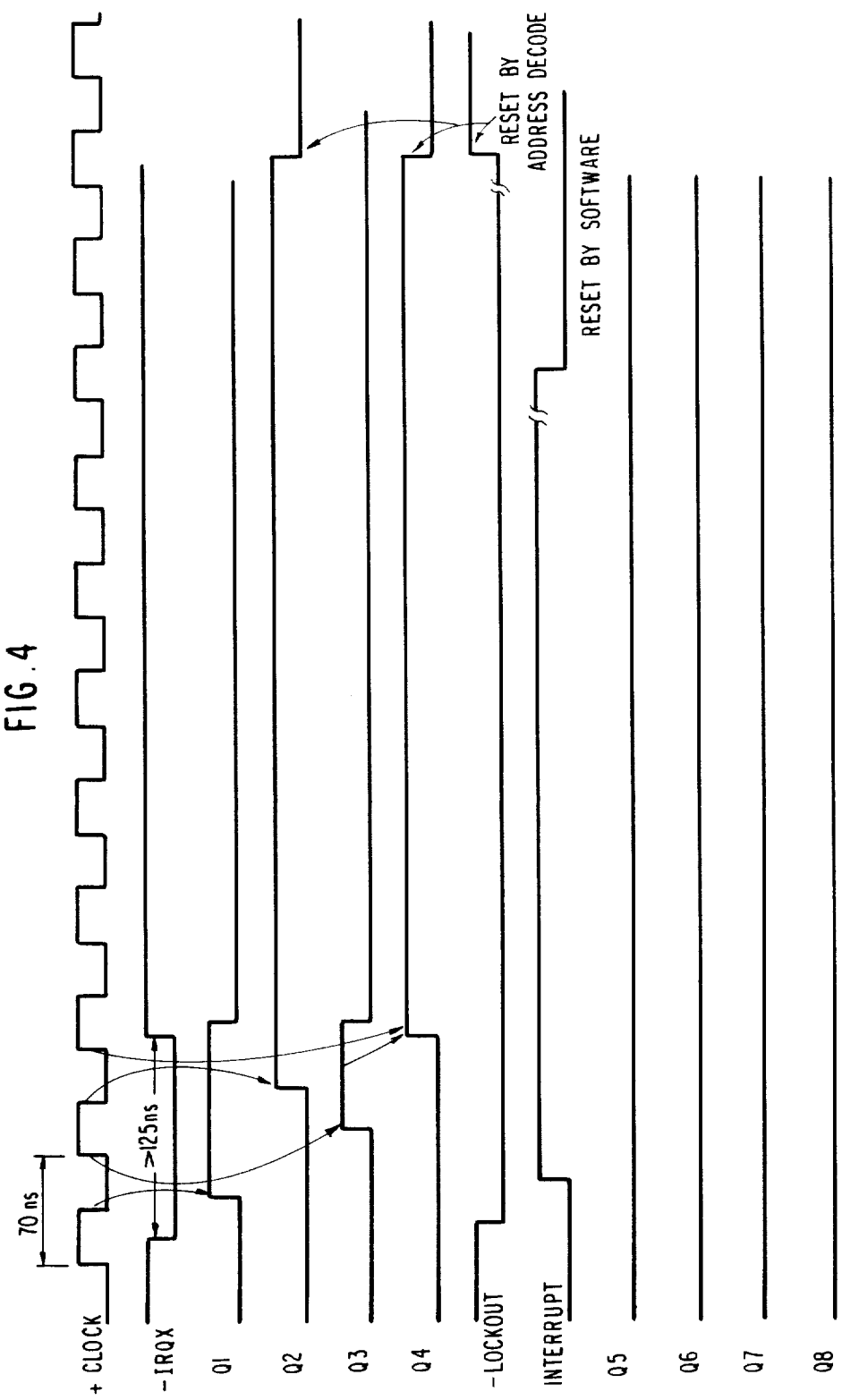
FIG. 4 is a timing diagram for the non-local generation of an interrupt request for the circuit of FIG. 2.

The preceding discussion involved an interrupt signal generated at the illustrated interrupt circuit. This interrupt circuit must respond as well to similar interrupt requests on the shared interrupt request line 12 originating from other interrupt circuits. The timing diagram for this operation is shown in FIG. 4. At some random time, the −IRQX signal on the shared interrupt request line goes low. Although the interrupt circuit of FIG. 2 produces a −IRQX pulse of 560 ns, it will be assumed that there are other types of interrupt circuits connected to the request line 12 that produce only the minimum pulse width of 125 ns.

The negative −IRQX pulse immediately passes through the OR gate 38 to produce an active −LOCKOUT signal that prevents a locally generated interrupt signal from passing the first AND gate 26. It should be noted that this part of the lockout signal persists only for as long as the −IRQX signal remains low.

The negative −IRQX pulse is also led to the two pairs of flip-flops 50–56. If the externally generated pulse is longer than 105 ns, one of the two outputs −Q2 and −Q4 is latched low producing a self-sustaining −LOCKOUT signal regardless of the continuation of the −IRQX pulse. Once again, this lockout is reset by software in the interrupt handling procedure through the ADDRESS DECODE RESET input to the OR gate 62.

The interrupt handling procedure is likely to poll the device associated with the illustrated interrupt circuit to determine if it is requesting interrupt servicing. It is irrelevant whether this interrupt circuit was the one that actually produced the −IRQX pulse on the shared interrupt request line 12. If the attached device sets its interrupt signal active prior to the last time it is polled, its interrupt is serviced even though this interrupt circuit has never produced a −IRQX pulse. Once it is serviced, its INTERRUPT request goes inactive. If the local INTERRUPT signal goes active, after the last polling of the device, the −LOCKOUT signal is removed without that interrupt being serviced. However, because the INTERRUPT signal should remain high until the requested service is completed, the removal of the −LOCKOUT enables the INTERRUPT signal to pass the first AND gate 26. As a result, a new −IRQX pulse is inserted on the shared interrupt request line 12.

The pulse width discrimination prevents the spurious generation of a lockout signal for any noise pulses having a pulse width of less than 70 ns. Some noise pulse having a pulse width of 70–105 ns and all noise pulses having a greater pulse width could produce a spurious lockout. However, the inventor has found that the noise pulses on the shared interrupt request line 12 never have a pulse width greater than 20 ns and most are considerably shorter. Therefore, the invention works completely satisfactorily.

Having thus described my invention, what I claim as new, and desire to secure by Letters Patent is:

1. In an interrupt system having an interrupt handler interconnection for receiving an interrupt request signal and being responsive to said interrupt request signal on said interconnection having a duration greater than a first predetermined minimum time, said interconnection being subject to possible exposure to noise pulses, an interrupt interface circuit interposed between said interconnection and a peripheral device for receiving a request for an interrupt from said peripheral device and furnishing a said interrupt request signal to said interconnection, said interface circuit comprising:

signal generating means responsive to said device when said device requests an interrupt for impressing upon said interconnection an interrupt request signal having a duration greater than said first minimum time;

first inhibiting means connected to said interconnection and responsive to any signal applied to said interconnection when and only if said any signal has a duration greater than a second predetermined minimum time for inhibiting said signal generating means until receipt of a reset signal, said second minimum time being greater than the duration of substantially all noise pulses on said interconnection and less than said first minimum time; and means for receiving said reset signal and then restoring said first inhibiting means to its initial state.

2. An interrupt interface circuit as recited in claim 1, further comprising:

second inhibiting means responsive to said any signal on said interconnection for inhibiting said signal generating means substantially upon and only during the duration of said any signal.

3. In an interrupt system having an interconnection for an external interrupt signal, an interrupt interface circuit interposed between a peripheral device and said interconnection for permitting sharing by said device of a given interrupt level with other devices connected to said interconnection in like manner, said interconnection being subject to ambient noise pulses in addition to receiving valid interrupt request signals from said devices, said interface circuit comprising:

pulse generating means for impressing on said interconnection a pulse transition to a first level from a second level, said interconnection being held at said first level if such pulse generating means is impressing a first level on said interconnection;

interrupt state means having an interrupt state and a noninterrupt state in response to an internal interrupt signal generated by said peripheral device requesting an interrupt, said state means causing said pulse generating means to generate said transition to said first level when said state means are in said interrupt state;

inhibiting means responsive to a transition to said first level on said interconnection for inhibiting by an active inhibit signal the generation of any subsequent first level signal by said pulse generating means;

said inhibiting means including latch means responsive to the continuance of said first level signal for a predetermined period of time at least equal to the duration of substantially all noise pulses on said interconnection to thereafter maintain said inhibiting signal.

4. An interrupt interface circuit as recited in claim 3, wherein said interrupt state means maintains said inhibiting means active for a time only as long as said predetermined period and said latch means maintains said inhibiting means active after said predetermined period until reset.

5. An interrupt interface circuit as recited in claim 4, further comprising:

clock signal means producing a clock signal having a clock period; and wherein said pulse generating means and said interrupt state means comprises a chain of flip-flops clocked by said clock signals.

6. An interrupt interface circuit as as recited in claim 5, wherein said latch means are responsive to the continuance of said first level signal for any time longer than one and one-half clock periods.

7. A noise resistant interrupt circuit having an input for receiving an interrupt request signal, and having means for latching, for a fixed period of time as an interrupt request, any signal on the input of said circuit having a first duration, if the output of said circuit is not in the state indicating a latched request, and means for resettably locking the circuit against further inputs, characterized in that:

(a) means are provided for generating a lock-out signal when and so long as a signal is present on said output, such lockout signal inhibiting any response of the circuit to signal changes on the input;

(b) means are provided to latch said lock-out signal only in respect of signals on said output of a second duration, longer than the first duration; and (c) failure of the output signal after a period between the two durations results in an automatic internal reset of said lock-out signal, the resetting means being normally externally operated, whereby a noise signal at said output having a duration less than said second duration will not operate to latch said lock-out signal, and any said lock-out signal resulting therefrom will be subject to said automatic reset.

8. A circuit as claimed in claim 7, wherein the second duration is greater than the expected longest noise pulse reaching the circuit.

9. Data processing apparatus having plural interrupt sources, each communicating through its own circuit as claimed in claim 8, the outputs of the several circuits being connected in common to the apparatus interrupt handler, the lockout means being responsive, logically, to any of a locally latched interrupt request and a remotely latched interrupt request.

10. Apparatus as claimed in claim 9, wherein each said circuit is independently externally clocked.

11. Apparatus as claimed in claim 10, wherein the internal timing of the circuit is derived from the external clocking, and is determined by chains of flip-flop circuits, arranged to determine said fixed period of time and for separately measuring said second duration of time, said second duration of time being greater than one and one-half clock period.

* * * * *